United States Patent
Frey et al.

(10) Patent No.: US 8,572,363 B2
(45) Date of Patent: Oct. 29, 2013

(54) COUPLING AN FPGA UNIT TO A MEMORY USING A DIGITAL POTENTIMETER

(75) Inventors: Tom-Fabian Frey, Braunschweig (DE); Jan Watermann, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 604 days.

(21) Appl. No.: 12/747,153

(22) PCT Filed: Dec. 15, 2008

(86) PCT No.: PCT/EP2008/010646
§ 371 (c)(1),
(2), (4) Date: Aug. 31, 2010

(87) PCT Pub. No.: WO2009/077149
PCT Pub. Date: Jun. 25, 2009

(65) Prior Publication Data
US 2010/0325407 A1  Dec. 23, 2010

(30) Foreign Application Priority Data
Dec. 14, 2007 (DE) .......... 10 2007 060 234

(51) Int. Cl.
*G06F 15/177* (2006.01)
(52) U.S. Cl.
USPC ................................. 713/2; 713/1
(58) Field of Classification Search
USPC .......................................... 713/1, 2
See application file for complete search history.

(56) References Cited

U.S. PATENT DOCUMENTS

| 5,269,022 | A | * | 12/1993 | Shinjo et al. ............ 713/2 |
| 6,079,016 | A |   | 6/2000  | Park |
| 6,219,721 | B1 | * | 4/2001 | Su ................................ 710/2 |
| 6,754,818 | B1 | * | 6/2004 | Lee et al. .................. 713/2 |
| 7,146,541 | B2 | * | 12/2006 | Blumberg et al. ......... 714/38.14 |
| 7,487,344 | B2 | * | 2/2009 | Grieve et al. .............. 713/2 |
| 7,822,958 | B1 | * | 10/2010 | Allen et al. ............... 713/1 |
| 2004/0093488 | A1 | * | 5/2004 | Horanzy ................. 713/1 |
| 2006/0104457 | A1 | * | 5/2006 | Kawaguchi et al. ...... 381/91 |

FOREIGN PATENT DOCUMENTS

EP 0939367 A2 9/1999
JP 2007148604 A 6/2007

OTHER PUBLICATIONS

Champaigne et al., "Low-power Electronics for Distributed Impact Detection and Piezoelectric Sensor Applications," Aerospace Conference IEEE, Mar. 3, 2007, pp. 1-8, 2007, Piscataway, New Jersey, USA.

(Continued)

*Primary Examiner* — Chun Cao
(74) *Attorney, Agent, or Firm* — Kilpatrick Townsend & Stockton LLP

(57) ABSTRACT

There is provided an electronic device comprising an FPGA unit (100), a first and a second memory (210, 220) for storing boot data for the FPGA unit and a digital potentiometer (300) for storing a first and a second setting. In the first setting of the potentiometer the first memory (210) is coupled to the FPGA unit (100) and in the second setting of the potentiometer the second memory (220) is coupled to the FPGA unit (100) for booting.

5 Claims, 1 Drawing Sheet

(56) References Cited

OTHER PUBLICATIONS

Tsang et al., "An Innovative Approach for RMS and THD Control by Field Programmable Gate Arrays," Power Electronics and Drive Systems, 2003, The Fifth International Conference on Singapore IEEE, Nov. 17-20, 2003 pp. 830-832. Piscataway, New Jersey, USA.

International Search Report for PCT Application No. PCT/EP2008/010646 mailed on May 7, 2009; 4 pages.
Written Opinion for PCT Application No. PCT/EP2008/010646 mailed on May 7, 2009; 6 pages.

* cited by examiner

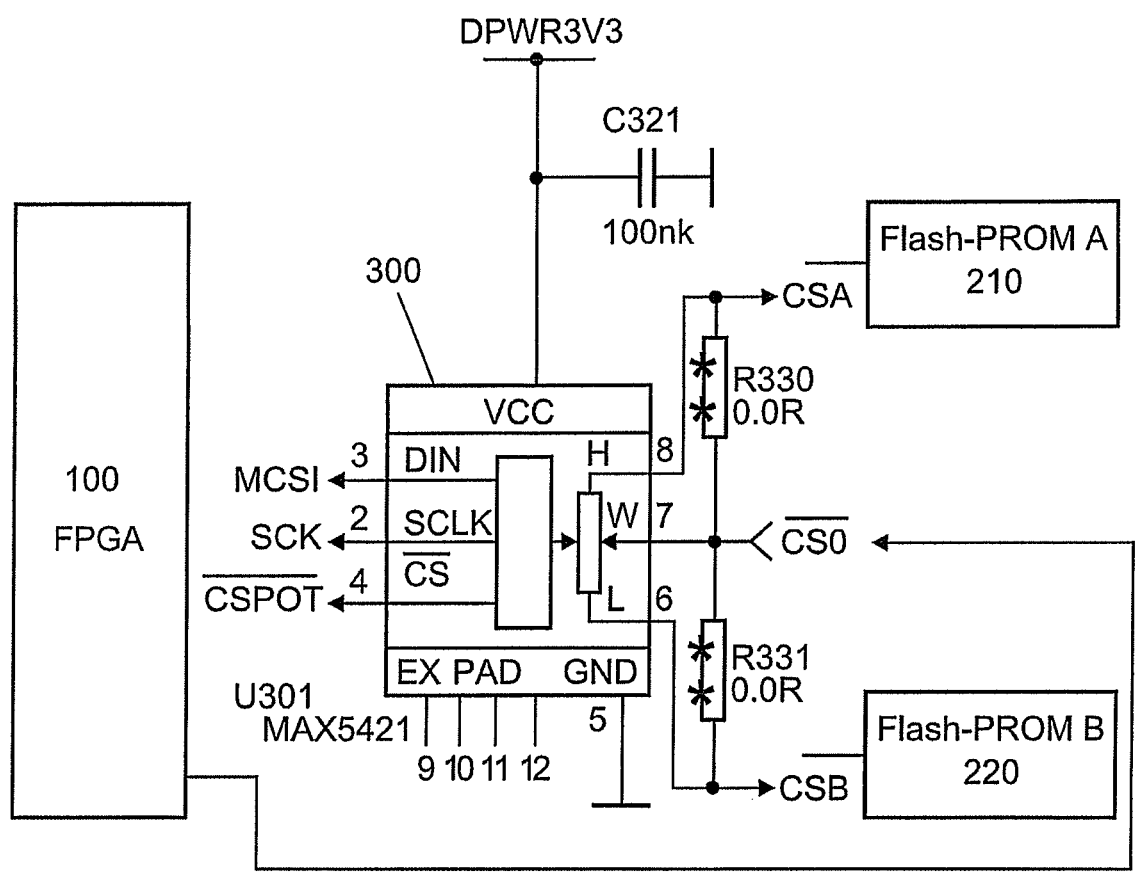

COUPLING AN FPGA UNIT TO A MEMORY USING A DIGITAL POTENTIMETER

CROSS-REFERENCE TO RELATED APPLICATIONS

This application is a U.S. National Stage of PCT Application No. PCT/EP2008/010646 filed Dec. 15, 2008, which claims the benefit of German Application No. 102007060234.2 filed Dec. 14, 2007, the contents of both applications hereby incorporated by reference in their entirety for all purposes.

FIELD OF THE INVENTION

The present invention concerns an electronic digital device having an FPGA (field programmable gate array).

BACKGROUND

An FPGA (field programmable gate array; in situ modifiable logic component) represents a programmable integrated circuit. In an FPGA various circuits can be formed by specific configurations of internal structures. The FPGA has programmable logic components.

If a software update of an FPGA-based system is carried out, it can happen that the updated software involves an error so that booting or starting up of the FPGA-based system is no longer possible. In such cases it may be necessary to replace at least a part of the electronic components. To avoid that a controller can be provided in the FPGA-based system, which can serve to control the software update.

As general state of the art reference is to be directed to U.S. Pat. No. 6,079,016 and EP 0 939 367 A2.

SUMMARY

The object of the present invention is to provide an electronic device having an FPGA, which permits a software update and which is less expensive to manufacture.

That object is attained by an electronic device as set forth in claim 1.

Thus there is provided an electronic device comprising an FPGA unit, a first and a second memory for storing boot data for the FPGA unit and a digital potentiometer for storing a first and a second setting. In the first setting of the potentiometer the first memory is coupled to the FPGA unit (for booting) and in the second setting of the potentiometer the second memory is coupled to the FPGA unit for booting.

In accordance with an aspect of the present invention the FPGA unit and the digital potentiometer respectively have an integrated serial interface.

In a further aspect of the invention the digital potentiometer is suitable in a test mode of forwarding the signals needed for booting of the FPGA unit to the second memory so that the FPGA unit can be booted from the second memory.

The present invention also concerns a digital microphone having an electronic device as described above.

The invention also concerns a method of controlling an electronic device having an FPGA (field programmable gate array) unit, a first and a second memory and a digital potentiometer. The first and second memories are used for storing boot data of the FPGA unit. The digital potentiometer is used for storing a first and a second setting. In the first setting of the digital potentiometer the first memory is coupled to the FPGA unit and in the second setting of the digital potentiometer the second memory is coupled to the FPGA unit for booting.

The invention concerns the notion of permitting update of the operating software in two different boot sectors of the electronic digital device so that the device can boot from two different memories. For that purpose there can be provided an FPGA which permits automatic booting for example from a serial flash memory. In addition there are at least two different boot sectors in the memory or memories. Usually the FPGA generates SPI bus signals such as for example CS\, MOSI, MISO, and SCLK for reading out the serial flash PROM. Various boot PROMs can be addressed by the chip select signals CS being redirected.

Redirection of the chip select signals can be effected for example by means of a programmable (digital) potentiometer. The slider position of the programmable potentiometer can be set both temporarily or volatilely and also permanently or non-volatilely. The digital programmable potentiometer preferably has an SPI interface.

Further configurations of the invention are subject-matter of the appendant claims.

In accordance with the invention the electronic potentiometer is used as a change-over switch (between two memories) for a boot setting of an FPGA. The currentless condition can be bridged by permanent storage of the slider position in the potentiometer.

Advantages and embodiments by way of example of the invention are described in greater detail hereinafter with reference to the drawing.

BRIEF DESCRIPTION OF THE DRAWINGS

FIG. 1 shows a diagrammatic view of an electronic digital device in a first embodiment.

DETAILED DESCRIPTION

FIG. 1 shows a diagrammatic view of an electronic (digital) device in a first embodiment. The electronic device has a field programmable gate array FPGA component 100, a first memory 210 and a second memory 220 as well as a digital (programmable) potentiometer 300. A digital (programmable) potentiometer represents a digitally controllable electronic component which can simulate the analog functions of a potentiometer. A non-volatile switching-over process can be made possible with the digital potentiometer. The first and second memories 210, 220 can each be in the form of a respective flash PROM. The digital potentiometer 300 can be adapted to store at least two states. In the first state of the potentiometer 300 the first memory 210 is coupled to the FPGA 100 component and in the second state of the digital potentiometer 300 the second memory 220 is coupled to the FPGA component 100. The first and second memories 210, 220 can be respectively used for storage of the data needed for the boot process for the FPGA 100. By means of the digital potentiometer 300 for example the chip select signals of the FPGA can be redirected to the first or second memory 210, 220. The digital potentiometer 300 preferably has a serial peripheral interface (SPI).

The FPGA 100 component can receive configuration data or updating data by way of an interface (not shown) and store same in the first and/or second memory 210, 220. Those data can include data needed for example for booting the FPGA 100. After the data are stored in the first and/or second memory 210, 220 the FPGA 100 component can be booted from one of the two memories 210, 220. In a test boot mode the chip select signal CS\ is at least temporarily redirected. After a successful boot-up process (for example by the data needed for the boot-up process having been read out of the first or second memory 210, 220) has been detected, permanent resetting of the digital potentiometer 310 can be effected so that the first or second memory is permanently coupled to the FPGA 100. In particular it is possible in that way to test the transmitted configuration or updating data. If the booting process was successful then the configuration or updating data were error-free transmitted and stored in one of the two memories 210, 220.

The FPGA 100 component described in accordance with the first embodiment, the first and second memories 210, 220 and the digital potentiometer 300 can be implemented for example in a digital microphone.

The microphone can have a software update mode which makes it possible to update the software for the digital microphone. For that purpose the solution should require a small amount of space on the circuit board, it should involve a low level of power consumption and it should be an operationally reliable solution. Preferably the solution should manage without an additional controller. In accordance with the invention it is possible to boot two different memories 210, 220. If the data stored in one of the memories are defective and booting is no longer possible then it is possible to switch over to the other memory by the digital potentiometer 300.

The invention claimed is:

1. An electronic device comprising:
an FPGA unit,
a first and a second memory for storing boot data for the FPGA unit, and
a digital potentiometer for storing a first setting and a second setting,
wherein in the first setting of the digital potentiometer the first memory is coupled to the FPGA unit and wherein in the second setting of the digital potentiometer the second memory is coupled to the FPGA unit, the digital potentiometer having a slider position for non-volatilely switching between the first setting and the second setting.

2. A device as set forth in claim 1 wherein the FPGA unit and the digital potentiometer each have a respective integrated serial peripheral interface (SPI).

3. A device as set forth in claim 1 wherein the digital potentiometer is suited in a test mode for passing signals needed for booting of the FPGA unit to the second memory so that the FPGA unit is booted from the second memory.

4. A digital microphone having an electronic device as set forth in claim 1.

5. A method of controlling an electronic device which has an FPGA unit comprising the steps:
storing boot data for the FPGA unit in a first and a second memory,
storing a first setting and a second setting in a digital potentiometer,
non-volatilely coupling the first memory to the FPGA unit in the first setting of the digital potentiometer using a slider position of the digital potentiometer,
non-volatilely coupling the second memory to the FPGA unit in the second setting of the digital potentiometer using a slider position of the digital potentiometer, and
booting the FPGA unit in the second setting of the digital potentiometer using boot data from the second memory.

* * * * *

UNITED STATES PATENT AND TRADEMARK OFFICE
CERTIFICATE OF CORRECTION

PATENT NO. : 8,572,363 B2  
APPLICATION NO. : 12/747153  
DATED : October 29, 2013  
INVENTOR(S) : Frey et al.

Page 1 of 1

It is certified that error appears in the above-identified patent and that said Letters Patent is hereby corrected as shown below:

On the Title Page:

Item (57) In the Abstract:

In the second column, line 5, after "potentiometer", please insert a --,--.

In the second column, line 6, after "(100)", please insert a --,--.

In the second column, line 6, after "potentiometer", please insert a --,--.

In the Claims:

Column 4, line 1, claim 1: after "potentiometer", please insert a --,--.

Column 4, line 2, claim 1: after "unit", please insert a --,--.

Column 4, line 3, claim 1: after "potentiometer", please insert a --,--.

Column 4, line 12, claim 3: after "suited", please insert a --,--.

Column 4, line 12, claim 3: after "mode", please insert a --,--.

Signed and Sealed this  
Eleventh Day of March, 2014

Michelle K. Lee  
*Deputy Director of the United States Patent and Trademark Office*